Feb. 27, 1962 E. A. MYCK ETAL 3,022,641
CONTROL APPARATUS FOR AIR CONDITIONING SYSTEMS
Filed Dec. 28, 1956
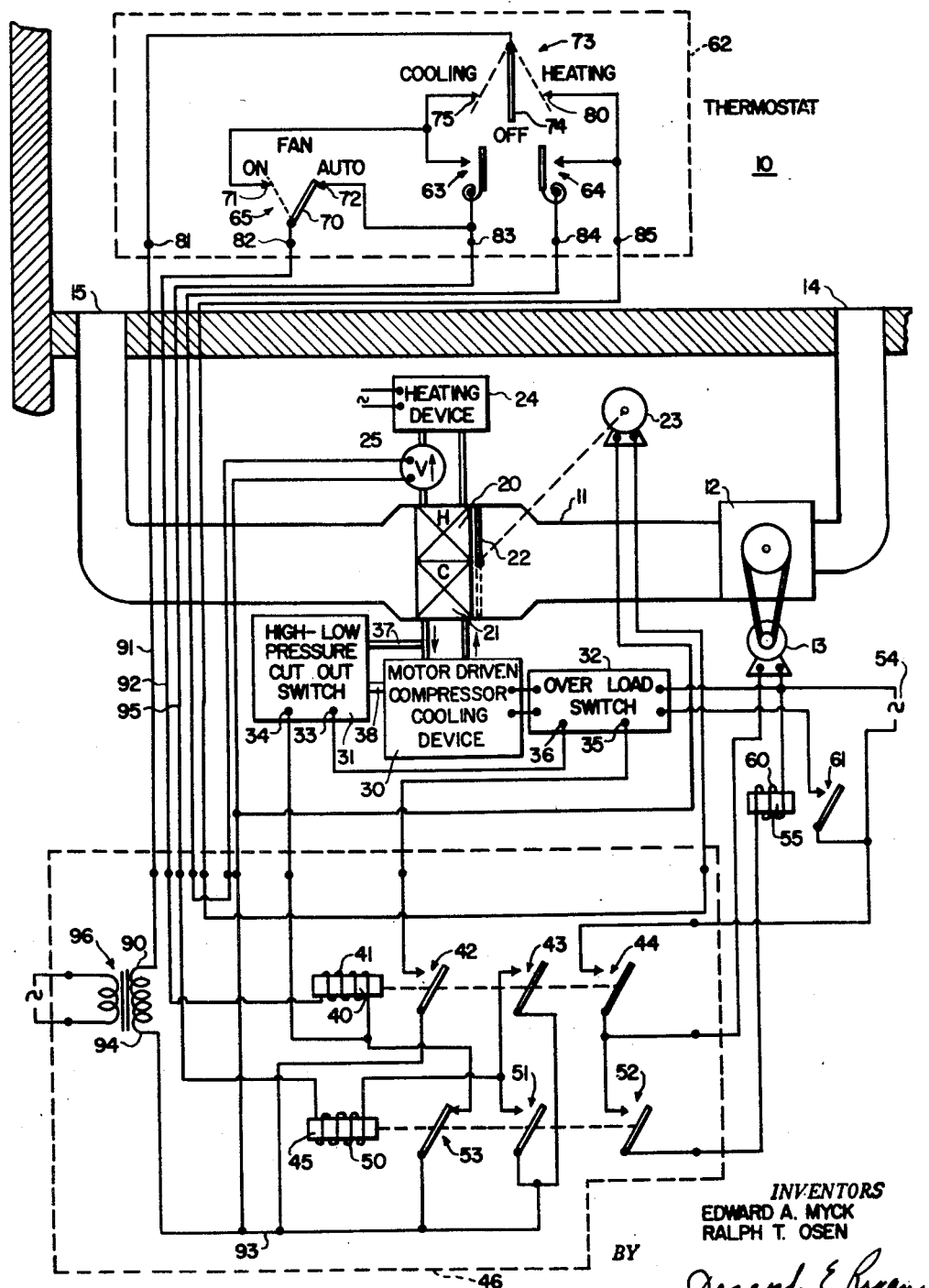
INVENTORS
EDWARD A. MYCK
RALPH T. OSEN
BY
Joseph E Ryan
ATTORNEY

United States Patent Office 3,022,641
Patented Feb. 27, 1962

3,022,641
CONTROL APPARATUS FOR AIR CONDITIONING SYSTEMS
Edward A. Myck, Edina, and Ralph T. Osen, Golden Valley, Minn., assignors to Minneapolis-Honeywell Regulator Company, Minneapolis, Minn., a corporation of Delaware
Filed Dec. 28, 1956, Ser. No. 631,143
12 Claims. (Cl. 62—163)

The present invention is concerned with an improved safety control circuit wherein upon the occurrence of an abnormal condition a first relay is de-energized; however, the relay cannot be energized until a second relay is de-energized.

While this control circuit is applicable to various control applications it is particularly desirable in air-conditioning systems where motor-driven compressors are used to provide cooling. There is a need for protection against the existence of abnormal operating conditions in such equipment. Specifically, the use of overload switches which shut down the compressor motor upon the current to the motor becoming excessive and high-low pressure cutout switches which shut down the motor when the pressure of the refrigerant in the system is below or exceeds some particular value.

Heretofore, a control system for controlling the operation of an air circulating device and a refrigeration compressor had a first relay which upon energization brought about operation of a fan. This first relay was connected to a source of power through a parallel circuit having as one branch a holding circuit including a normally open set of contacts controlled by the fan relay and the abnormal condition responsive switches, the other branch having a normally closed set of contacts of a control relay. The control relay controls the operation of the cooling device or compressor motor. Both the fan relay and the control relay were connected to a source of power through a temperature responsive switch or room thermostat and whenever the room thermostat called for cooling the fan relay and control relay were energized.

A major disadvantage of the mentioned control circuit is in the ability of two relays to operate in a particular sequence when energized simultaneously. For such a circuit to operate properly, it is necessary for the fan relay to pull in first to close its holding contact before the normally closed contacts of the control relay are opened. If, for some reason during the shipment of a panel containing this circuit the adjustment of the relays is changed and the control relay pulls in faster than the fan relay the malfunction exists in the circuit.

The present invention is concerned with the improvement of the aforementioned circuit to eliminate the so-called "relay race," that is, the operation of the fan relay before the control relay. A normally open set of contacts are added on the fan relay and the control relay. The contacts are connected in parallel in the energization circuit of the control relay. Thus, it is necessary for the fan relay to be energized before the energization circuit of the control relay is closed. Once the control relay is energized a holding circuit is provided.

It is therefore an object of the present invention to provide an improved control apparatus.

Another object of the present invention is to provide a control circuit having two relays, a first relay can only be energized when a second relay is de-energized and the second relay can only be energized after the first relay is energized.

Still another object of the present invention is to provide an improved safety control circuit for air-conditioning apparatus.

These and other objects will become apparent upon the study of the specification and drawing of which a single FIGURE is a schematic drawing of the control system.

Space 10 is conditioned by the circulation of air through a duct 11 by a conventional air circulating device of fan 12. The fan is driven by a motor 13. As the air passes through duct 11 from a return passage 14 to a supply passage 15 it selectively passes through either a heating coil 20 or a cooling coil 21 depending upon the position of a motor-driven damper 22. The damper is driven by a motor 23. A conventional heating device 24 furnishes heating medium to heat exchanger 20. The supply of heating medium is controlled by a valve 25. A conventional cooling device or refrigeration apparatus 30 such as shown in the A. B. Newton Patent 2,214,700 is connected to supply cooling medium to heat exchanger 21. Associated with the cooling device is a high-low pressure cutout switch 31 such as shown in the Kronmiller Patent 2,377,503 which senses the pressure in the refrigeration apparatus. Switch 31 is connected to refrigeration apparatus 30 by conduits 37 and 38. Conduit 37 is connected on the suction side, and conduit 38 is connected on the discharge side. An overload switch 32 is connected in series with the power supply line to a motor of the cooling device. Both cutout switch 31 and overload switch 32 are of a conventional type and provide for an open circuit between their terminals 33 and 34 and 35 and 36, respectively, whenever an abnormal operating condition exists in the operation of the cooling device.

A fan relay 40 of a panel 46 has an energization winding 41 and three sets of normally open switches or contacts 42, 43 and 44 which are closed upon energization of the relay. A control relay 45 has an energization winding 50, two sets of normally open switches or contacts 51 and 52 and a set of normally closed contacts 53. Contacts 44 are connected to control the supply of power to fan motor 13 through a circuit traced as follows: from a source of power 54, fan motor 13, contact 44, and back to source of power 54. Contacts 52 are connected to control the energization of a starter relay or contactor 55 through a circuit traced as follows: from source of power 54, an energization winding 60 of contactor 55, contacts 52, contacts 44, and back to the source of power. Thus upon the energization of both relays 40 and 45 contactor 55 is energized to close switch 61 which connects source of power 54 through overload switch 32 to cooling device 30.

A control device or thermostat 62, which is placed in space 10, contains two temperature responsive bimetal controlled switches 63 and 64, a single pole, double throw fan switch 65 having a movable member 70 selectively engaging either an "on" contact 71 or an "auto" contact 72, and a single pole, double throw condition selecting switch 73 having a movable member 74 selectively engaging a cooling contact 75 or a heating contact 80. Movable member 74 is connected to thermostat terminal 81. Movable member 70 of the fan switch is connected to terminal 82. Fan switch contact 72 and one side of temperature responsive switch 63 are connected to thermostat terminal 83. One side of temperature responsive switch 64 is connected to thermostat terminal 84. Heating contact 80 and the other side of temperature responsive switch 64 are connected to thermostat terminal 85.

Terminal 81 of the thermostat is connected to one side 90 of a source of power 96 by conductor 91. Energization winding 41 of the fan relay is connected to thermostat terminal 82 by a conductor 92. The other extremity of energization winding 41 is connected to the stationary contact of contacts 53. The movable contact of contacts 53 is connected by a conductor 93 to the other side 94 of the source of power. Energization winding 50 of the control relay is connected to thermostat terminal 83 by conductor 95. The other extremity of the energization winding is connected to the stationary contacts of contacts 43 and 51. The movable contacts of contacts 43 and 51 are both connected through conductor 93 to the source of power. Contacts 53 are shunted by a circuit including high-low pressure cutout switch and the overload switch and contacts 42, that is traced as follows: terminals 34, 33, 36, and 35, and the contacts 42 to conductor 93. Valve 25 is connected between thermostat terminal 84 and extremity 94 of the source of power. Damper motor 23 is connected between thermostat terminal 85 and terminal 94.

*Operation*

As shown in the figure the control system is not operating. With power connected to the primary of transformer 96 and to supply 54, upon moving movable member 74 of the cooling and heating switch to the left to engage contact 75 the system is set for cooling operation. As shown the fan switch is in the automatic position with movable member 70 engaging contact 72. Upon an increase in the space temperature the thermostat 63 closes. A circuit would then be established to energize fan relay 40 as follows: power source terminal 90, conductor 91, terminal 81, movable member 74, contact 75, thermostat 63, contact 72, movable member 70, terminal 82, conductor 92, winding 41, contacts 53, conductor 93, and back to terminal 94 of the power source. Upon the energization of relay 40 contacts 44 would close to initiate operation of the fan motor 13 to begin circulation of air from the space through the cooling coil 21. The circuit for the energization of the fan relay included contacts 53 of control relay 45; however, since control relay 45 will remain de-energized until the fan relay is operated even though the thermostat 63 is closed energization of fan relay 40 is insured and there is no need to adjust the relays so that the fan relay is always first in a "relay race." Control relay 45 is energized through a circuit as follows: from the transformer terminal 90, conductor 91, terminal 81, movable member 74, contact 75, thermostate 63, terminal 83, conductor 95, winding 50, contacts 43 of the fan relay, conductor 93, and back to the transformer terminal 94. Thus it is seen that upon the energization of the fan relay and the closing of contacts 43 the control relay is energized. A holding circuit is provided for the control relay as soon as it is operated through contacts 51 along the same circuit heretofore traced except that now contacts 43 and 51 are closed in parallel. Energization of control relay 45 closes contacts 52 and since contacts 44 of the fan relay are closed starter 55 is energized. From this circuit it is apparent that the starter will not be energized unless the fan relay is energized to close the contacts 44 even though control relay 45 is energized.

While the fan relay 40 is energized through the control relay contacts 53 a holding circuit is established for the fan relay in parallel with the control relay contacts 53 through a circuit traced as follows: from winding 41 of the fan relay, terminals 34 and 33 of the high-low pressure cutout switch 31, terminals 36 and 35 of the overload switch 32, contacts 42 which are closed as soon as the fan relay is energized, and back to the power source terminal 94. With the circuit heretofore explained the cooling device will operate every time the thermostat calls for cooling to supply cooling medium to the heat exchanger 21. As the fan is on automatic operation the fan will be intermittently operated, whenever thermostat 63 calls for cooling. Each time thermostat closes the fan relay 40 will close and then control relay 45 will close to initiate operation of the fan motor 13 and the cooling device 30.

Let us assume that an abnormal operating condition exists such as the current to the cooling device becomes excessive and the overload switch 32 opens the circuit between terminals 35 and 36. This would open the energization or holding circuit for the fan relay and contacts 42, 43 and 44 would open to de-energize the fan and the starter 55. Subsequently should the overload switch cool down and the circuit be restored between terminals 35 and 36, fan relay 40 would not be re-energized as the holding circuit through the fan relay contacts 42 is broken. In order to restore energization of the fan relay contacts 53 of the control relay must be closed; however, the control relay is still energized. Therefore, in order to reset the system and place it back in normal operation the home owner is required to open thermostat 63 to break the energization circuit for control relay 45. Such an act would close contacts 53 to re-energize the fan relay and again close its holding circuit through the contacts 42. Once the system is reset the fan and cooling device are again placed in operation.

Should the home owners select continuous fan and the movable member 65 being moved to engage contact 71, the fan relay 40 would be continuously energized through a circuit as follows: from the transformer terminal 90, conductor 91, terminal 81, movable member 74, contact 75, contact 71, movable member 70, terminal 82, conductor 92, winding 41, the fan relay holding circuit including switches 31 and 32 and contacts 42, and back to the power source terminal 94 through conductor 93.

With the control system set for continuous fan operation and the space temperature being high enough to cause thermostat 63 to close, starter 55 is energized and the cooling device is placed in operation. Should an abnormal condition occur in the system and either switch 31 or 32 open, for example, the circuit between terminals 33 and 34 open, the holding circuit of the fan relay is again broken to de-energize the fan relay to open contacts 41 and de-energize the fan motor 13 and the cooling device. Upon the control system restoring to its normal condition, that is the closing of the circuit between terminals 33 and 34 of the high-low pressure cutout switch 31 the fan relay is not energized as its holding circuit through switch 31 is broken and contacts 53 are now open. In order to restore normal operation it is again necessary for the home owner to reset the system by turning down thermostat 63 to open its contacts. This de-energizes the control relay to close contacts 53 and energize the fan relay. As soon as the fan relay is energized its contacts 43 re-establish the energization circuit for the control relay.

By the addition of contacts 43 to the fan relay and contacts 51 to the control relay an improved operation is obtained in the control system. Let us assume that these contacts are shorted. Also, let us assume that the fan switch is placed so that the movable member 65 engages contact 72. Each time thermostat 63 closes proper operation of the system would require the fan relay 40 to operate first as the energization for the fan relay is through the contacts 53 of the control relay. Should the relays get slightly out of adjustment during shipment of panel 46, it is possible for the control relay to operate faster upon closing thermostat 63. This would open contacts 53 before the fan relay was energized to close its holding circuit through contact 42. In other words, it is seen without contact 43 and 51 for proper operation of the control system when the fan is in the automatic position it is necessary that the fan relay be first to pull in or as commonly known it is necessary for the fan relay to win the "relay race" between the fan relay and the control relay each time the thermostat calls for cooling. By the addition of contacts 44 and 52 the control relay cannot be energized until the fan relay is energized and the contacts 43 are closed. The addition of contacts 43 and 51 eliminate the need for the critical adjustment of the relay.

Upon moving movable member 74 to the heating contact 80, heating is obtained in a conventional manner each time the heating thermostat 64 closes. Valve 25 opens to deliver heated medium to the heating coil 20. Motor 23 is energized through the circuit including movable member 74 and contact 80 to move damper 22 away from the heating coil and in front of the cooling coil so that the air circulating through the duct 11 passes through the heating coil during the heating operation.

While the invention has been disclosed in a particular manner it is intended that the scope of the present invention only be limited by the appended claims in which we claim:

1. In control apparatus for an air-conditioning system having a cooling device and an air-circulating device; first relay means having an energization winding and three sets of normally open contacts; second relay means having an energization winding, two sets of normally open contacts and one set of normally closed contacts; abnormal operating condition sensing means having an open circuit upon the presence of an abnormal condition; temperature responsive switch means; a source of power; circuit means connecting said source of power, said temperature responsive switch means, said energization winding of the second relay means, and a parallel circuit of one set of contacts of said first relay and a normally open set of said second relay, in a series circuit; a parallel circuit comprising a series circuit of said abnormal condition sensing means and a second set of contacts of said first relay means and a circuit including said normally closed set of contacts of the second relay means; second circuit means connecting said source of power, said temperature responsive switch means, said energization winding of the first relay means, and said last mentioned parallel circuit in a series; a second source of power; circuit means including said third set of contacts of said first relay means for connecting said air-circulating means to said second source of power; and circuit means including said last mentioned third set of contacts and said set of normally open contacts of said second relay means for connecting said cooling means to said second source of power.

2. In an air-conditioning control system for controlling the operation of a cooling device and an air-circulating device; fan relay means having an energization winding and two normally open switches actuated thereby; control relay means having an energization winding, a normally open switch and a normally closed switch actuated thereby; abnormal operating condition sensing means having an open circuit upon the presence of an abnormal condition, temperature responsive switch means, a source of power; circuit means connecting said source of power, said temperature responsive switch means, said energization winding of the control relay means, and a parallel circuit of one switch of the fan relay and said normally open switch of said control relay, in a series circuit; a second parallel circuit having said abnormal condition sensing means and a second switch of said fan relay means in one branch and a normally closed switch of the control relay means in a second branch; second circuit means connecting said source of power, said energization winding of the fan relay means, and said second parallel circuit, in a seires circuit; circuit means including said fan relay means adapted to connect the air-circulating device to said source of power; and circuit means including said control relay means adapted to connect the cooling device to said source of power.

3. In an air-conditioning control system; first relay means having an energization means and a first and second normally open set of contacts, said relay means being adapted to control an air-circulating device; second relay means having an energization means and a normally closed set of contacts, said second relay means being adapted to control a cooling device; a source of power; a holding circuit including only said first set of contacts of the first relay means for connecting the energization means of said first relay means to said source; circuit means including said contacts of said second relay means for initially energizing said first relay means and for maintaining said first relay energized through said holding circuit after initial energization thereof, and circuit means including said second set of contacts of the first relay means for connecting said energization means of said second relay means to said source after said first relay means is energized.

4. In a control circuit, first relay means having an energization winding and a normally open switch controlled thereby second relay means having an energization winding and a normally closed switch controlled thereby, a source of power, circuit means including said normally closed switch for connecting said energization winding of the first relay means to said source of power, a holding circuit associated with said first relay, and independent of said second relay means, circuit means including said normally open switch for connecting said second relay means to said source of power, whereby upon energization of said first relay said second relay is subsequently energized, said first relay means being de-energized by opening said holding circuit and said first relay means not being re-energized until said second relay means is de-energized.

5. In a control circuit, first relay means having an energization winding and a normally open switch and a normally closed switch operated thereby, second relay means having an energization winding and a normally closed switch operated thereby, a source of power, circuit means including said normally closed switch of the second relay for connecting said energization winding of the first relay to said source of power, circuit means exclusive of said second relay means including said normally open switch of the first relay means for maintaining energization of said first relay means after it is initially energized, circuit means including said normally open switch of the first relay means for connecting said energization winding of the second relay means to said source of power, and means for holding said second relay in the energized position.

6. A control circuit for an electric motor driving a refrigerant compressor of an air conditioning unit, said compressor having a safety switch responsive to refrigerant pressure, said motor having a starter relay with a switch for connecting said motor to an electric power source, and having an overload device connected between said starter relay switch and said motor, said overload device having a switch which is opened when said device is energized by excessive current drawn by said motor, said unit having a fan for moving air to be cooled, having an electric motor for driving said fan, and having a thermostat for starting said motors when cooling is required, said circuit comprising a cooling relay having an energizing coil, said relay having a first switch that is closed when said relay is de-energized and having a second switch that is closed when said relay is energized, a fan relay having an energizing coil and having first and second switches that are closed when said fan relay is energized, a thermostat switch, means connecting said thermostat, said thermostat switch, said fan relay coil and said first switch of said cooling relay in series and to said source for energizing said fan relay, means connecting said thermostat switch, said thermostat, said cooling relay coil and said second switch of said fan relay in series and to said source for energizing said cooling relay after said fan relay is energized, said cooling relay when energized opening said first cooling relay switch, means connecting said safety switch, said overload switch, said fan relay coil and said first fan relay switch in series and to said source for maintaining said fan relay energized while said safety switch and said overload switch are closed, and means connecting said fan motor and said second fan relay switch in series and to said power source for starting said fan motor when said fan relay is energized.

7. A control circuit as claimed in claim 6 in which said means connecting said thermostat switch, said thermostat, said cooling relay coil and said second switch of said fan relay in series for energizing said cooling relay, includes third switches on said fan and cooling relays, said third switches being connected in parallel with each other and in series with said cooling relay.

8. A control circuit as claimed in claim 7 in which the means connecting said fan relay and said cooling relay to said source comprises the secondary winding of a stepdown transformer having a primary winding connected to said source.

9. A control circuit as claimed in claim 6 in which the means connecting said fan relay and said cooling relay to said source comprises the secondary winding of a stepdown transformer having a primary winding connected to said source.

10. In a control circuit for a refrigeration system having air cooling means, a fan, an electric motor for driving said fan, a safety switch which opens in response to an abnormal condition in said system, an electric supply circuit, and a magnetic starter having switching means for operating said air cooling means from said supply circuit, the improvement comprising a first switch which is closed when said system is not operating, second, third, fourth, and fifth switches which are open when said system is not operating, means for closing said third, fourth, and fifth switches, a reset switch, means including said reset and first switches for operating said switch closing means from said supply circuit, means for closing said second switch and opening said first switch, means including said reset switch and said fifth switch for operating said last mentioned means from said supply circuit after said third, fourth and fifth switch closing means has operated, means including said reset, third and safety switches for operating said third, fourth and fifth switch closing means from said supply circuit after said first switch has opened, means including said second and fourth switches for operating said starter from said supply circuit, and means including said fourth switch for operating said fan motor from said supply circuit.

11. In a control circuit for a refrigeration system having air cooling means, a fan, an electric motor for driving said fan, a safety switch which opens in response to an abnormal condition in said system, an electric supply circuit, and a magnetic starter having switching means for operating said air cooling means from said supply circuit, the improvement comprising a cooling relay having a first switch which is closed until said cooling relay has operated and having a second and a sixth switches which are closed when said cooling relay has operated, a fan relay having third, fourth and fifth switches which are closed when said fan relay has operated, a reset switch, means including said reset and first switches for operating said fan relay from said supply circuit, means including said reset switch and said fifth switch for operating said cooling relay from said supply circuit after said fan relay has operated, means including said reset, safety and third switches for operating said fan relay from said supply circuit after said cooling relay has operated and has opened said first switch, means including said second and fourth switches for operating said starter from said supply circuit, means including said fourth switch for operating said fan motor from said supply circuit, and means including said reset and said sixth switches for operating said cooling relay from said supply circuit even though said fan relay subsequently opens said fifth switch because of the opening of said safety switch, such operation of said cooling relay maintaining said first switch open to prevent reenergization of said fan relay until said reset switch is operated even though said safety circuit has closed.

12. In a control circuit for a refrigeration system having air cooling means, a fan, an electric motor for driving said fan, a safety switch which opens in response to an abnormal condition in said system, an electric supply circuit, a magnetic starter having switching means for operating said air cooling means from said supply circuit, and a thermostat for starting and stopping said air cooling means, the improvement comprising a cooling relay having a first switch which is closed until said cooling relay has operated and having a second switch which is closed when said cooling relay has operated, a fan relay having third, fourth and fifth switches which are closed when said fan relay has operated, a reset switch, means including said thermostat and said reset switch for operating said fan relay from said supply circuit, means including said thermostat, said reset switch and said fifth switch for operating said cooling relay from said supply circuit after said fan relay has operated, means including said thermostat and said reset, safety and third switches for operating said fan relay from said supply circuit after said cooling relay has operated and opened said first switch, means including said second and fourth switches for operating said starter from said supply circuit, means including said fourth switch for operating said fan motor from said supply circuit, and means including said reset switch for operating said cooling relay from said supply circuit even though said fan relay subsequently opens said fifth switch because of the opening of said safety switch, such operation of said cooling relay maintaining said first switch open to prevent reenergization of said fan relay until said reset switch is operated even though said safety switch has closed.

References Cited in the file of this patent

UNITED STATES PATENTS

| | | |
|---|---|---|
| 1,820,203 | Whitehead | Aug. 25, 1931 |
| 1,899,000 | Johnson | Feb. 28, 1933 |
| 2,557,727 | Chandler | June 19, 1951 |
| 2,684,456 | Sidebottom | July 20, 1954 |